United States Patent
Rasmussen

(10) Patent No.: US 7,833,468 B2
(45) Date of Patent: Nov. 16, 2010

(54) LONGITUDINAL ORIENTATION OF A TUBULAR THERMOPLASTIC FILM

(76) Inventor: Ole-Bendt Rasmussen, Sagenstrasse 12, CH-6316 Walchwil/Zug (CH)

( * ) Notice: Subject to any disclaimer, the term of this patent is extended or adjusted under 35 U.S.C. 154(b) by 1671 days.

(21) Appl. No.: 10/492,163

(22) PCT Filed: Oct. 14, 2002

(86) PCT No.: PCT/EP02/12193

§ 371 (c)(1),
(2), (4) Date: Apr. 9, 2004

(87) PCT Pub. No.: WO03/033241

PCT Pub. Date: Apr. 24, 2003

(65) Prior Publication Data

US 2004/0247730 A1    Dec. 9, 2004

(30) Foreign Application Priority Data

Oct. 12, 2001 (TW) .............................. 90125310 A
Oct. 15, 2001 (WO) ...................... PCT/EP01/12430
Jun. 21, 2002 (GB) ................................ 0214427.7

(51) Int. Cl.
*B29C 47/20* (2006.01)
*B29C 49/04* (2006.01)

(52) U.S. Cl. .................... 264/564; 264/571; 264/210.5; 425/377; 425/388

(58) Field of Classification Search ...................... None
See application file for complete search history.

(56) References Cited

U.S. PATENT DOCUMENTS 4,551,380 A * 11/1985 Schoenberg ................. 428/218
4,938,903 A *  7/1990 Schaeffer et al. ............ 264/565
5,951,943 A *  9/1999 Auf Der Heide et al. .... 264/564

* cited by examiner

*Primary Examiner*—Monica A Huson
(74) *Attorney, Agent, or Firm*—William J. Daniel

(57) ABSTRACT

The improved method and apparatus for longitudinal orientation of a tubular thermoplastic film as it leaves an annular extrusion die aims at a better control of this orientation. On its travel between the exit orifice (21) and the draw-down means, the at least partly molten film passes an annular frictional device (101), and the frictional force set-up hereby is variable in controlled manner. This device is cooled from its interior (105) in controlled manner by means of a fluid cooling medium. The friction may be controlled by airlubrication with air pressed through holes (123) in the frictional device or through microporous metal, (102) or alternatively by sucking the film against the frictional device. In a preferred embodiment the extrusion out of the die is peripherical extrusion, and in another preferred embodiment the film contains a blend of at least two compatible or compatibilized polymers, and the main proportion of the orientation takes place while one is predominantly in a crystalline state and the other predominantly in a molten state.

38 Claims, 5 Drawing Sheets

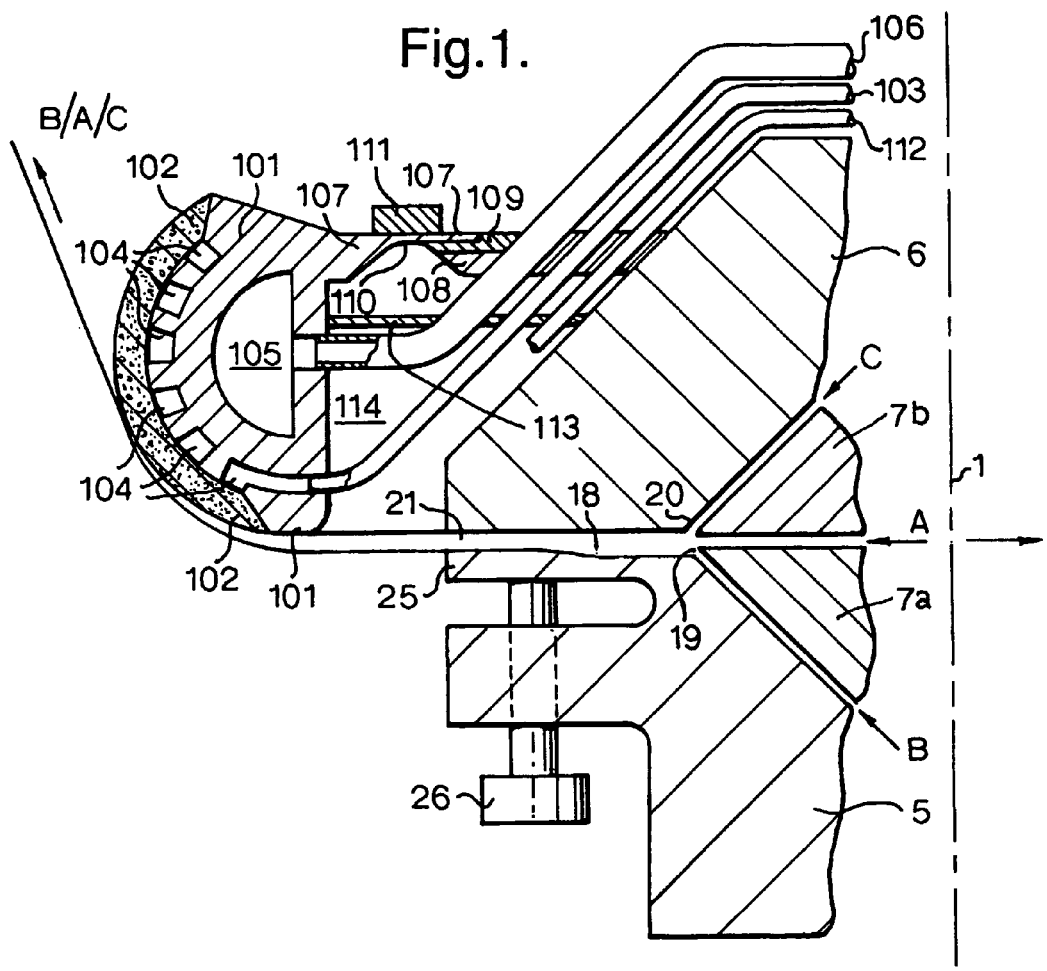
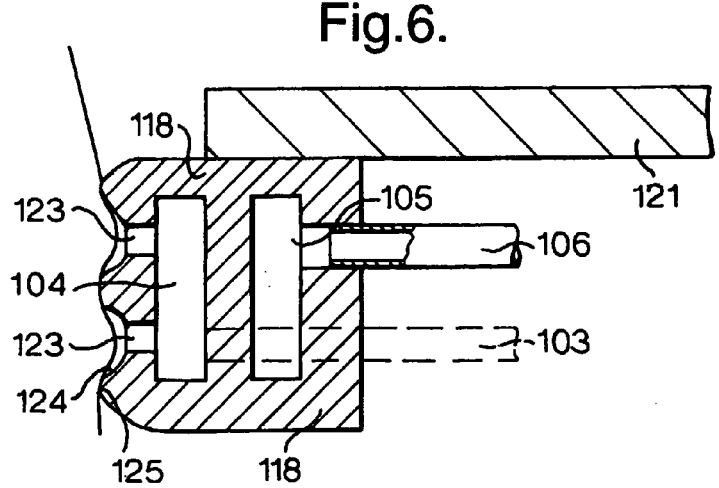

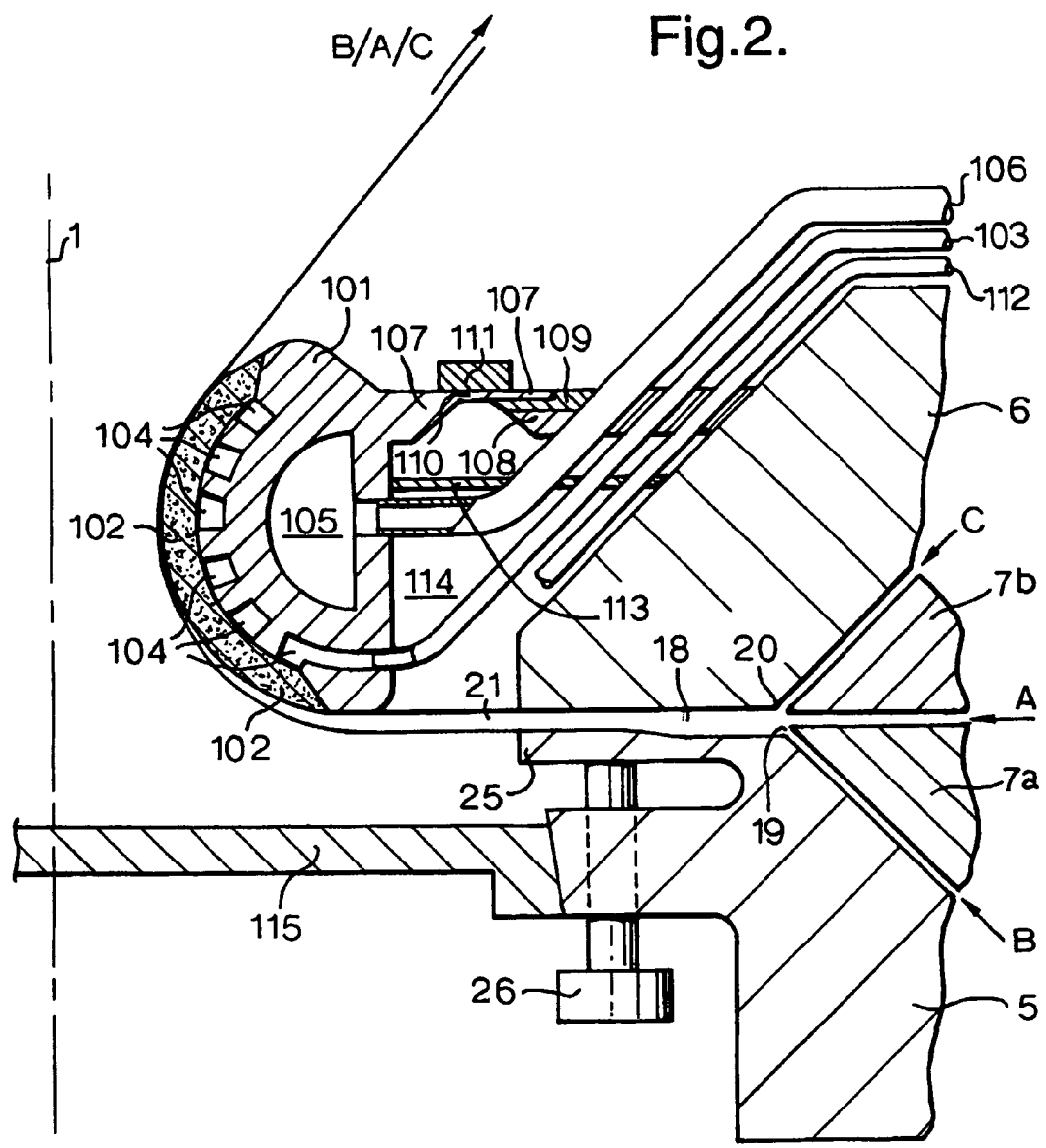

LONGITUDINAL ORIENTATION OF A TUBULAR THERMOPLASTIC FILM

The invention concerns method and apparatus as stated in the title. More specifically a substantial proportion of such orientation takes place by annular frictional means set up between the circular exit orifice of an annular extrusion die and the draw-down means (rollers, belts or the like) which hauls off the tube from the die, when the film is in molten or semi-molten state.

The invention has been conceived with a special view to the manufacture of cross-laminates, i.e. laminates comprising two or more films which each are uniaxially oriented or are biaxially oriented with one direction dominating, and are laminated with the (dominating) directions of orientation crossing each other. This can in practice be done by giving a tubular film a generally uniaxial orientation, cutting it helically to from a web with biassed orientation, and laminating two or more such webs with the orientations criss-crossing each other. There can also be a generally longitudinally orientated web included in the laminate.

Alternatively or supplementarily, the orientation on bias can be achieved in generally molten state by "twisting" the tubular film while it is hauled off form the extrusion die.

A survey over the technology concerning cross laminated film is given in the inventor's WO-A-93/14928.

More precisely expressed the method of the invention concerns a process of forming a tubular oriented film by extruding a flow of at least one molten thermoplastic material from a circular extrusion die, in which process the flow having left a circular exit orifice in the die is cooled and is oriented at least in the longitudinal direction while it still is at least partly molten, whereby the longitudinal orientation takes place by a pulling force set up between the exit orifice and moving draw-down means.

In this process the still at least partly molten flow on its travel between the exit orifice and the draw-down means passes and is in frictional contact with an annular device (hereinafter the frictional device), and the frictional force set up by this contact is variable in controllable manner other than by adjusting the temperature in the flow or the tensions in the flow during its contact with the device.

A method and an apparatus of this kind is known from DE-A-4308689. That invention carries out the longitudinal orientation mainly in molten state and the transverse orientation mainly within the "range of crystallization", whereby the effect of blowing to obtain transverse orientation is enhanced. In that respect the technology deviates from the aim of the present invention, which is to promote longitudinal orientation. However, in DE-A-4308689 there is an annular insert in the bubble which, necessarily although unintendedly, by friction against the film contributes to its longitudinal orientation. There is an annular nozzle surrounding this annular insert which blows towards the tube and the insert. At this stage the tube is in "the range of crystallization". The function of those devices is to separate a first part of the film —"bubble" from the rest, so that the tube can be strongly blown by over pressure in the "bubble" when the thermoplastic material has been brought into the "range of crystallization". At the same time the pressure in the bubble is kept near to the ambient pressure in the zone where the material is fully molten, so that transverse stretching here is avoided.

In addition to strong air-cooling from the outside of the bubble in DE-A-4308689, there is internal air cooling in the bubble upstream of the mentioned insert. This will also cool the insert, but there is not disclosed any means for controlling the temperature of this insert. The friction between the extruded tube can probably for a given temperature of the insert and a given pressure in the bubble downstream of the insert, be controlled by the amount of air blown towards the tube while the latter passes the insert, however the prior art does not mention anything about such control of friction.

A patent from about 1975 issued to the Dutch Van Leer organization or one of its subsidiaries (the inventor has not at the time of filing this application been able to identify it further) concerns longitudinal orientation of the extruded tube in solid state over a mandrel inside the tube, while the latter is hauled off from the extrusion die.

However in practice it is very difficult to carry out this method due to strong contraction forces which are set up when the solid film is drawn, and which tries to hold the tube firmly to the mandrel.

Finally it should be mentioned that mandrels inside the extruded tube have been widely used for calibration of the tube. As examples reference is made to GB-A-2112703 and to EP-A-0285368.

The present invention being the process of forming a tubular oriented film and the device therefor is characterised by the frictional device, which either can be arranged inside the bubble or outside the bubble being cooled from within by means of a fluid cooling medium to give its surface in contact with the flow a controllable temperature, and further that this temperature and the said friction is controllable to produce between the said frictional device and the draw-down means, a contribution to the longitudinal orientation which makes the total longitudinal orientation whereby the tubular product film has a longitudinal shrinkability. The shrinkability preferably is of a factor of no less than about 4, referring to shrink testing carried out at the upper limit of the melting range of the extruded film, that is the film, when heated to the shrink testing temperature shrinks in the longitudinal direction to one quarter or less of its length.

Having left the frictional device the tubular film may be allowed to contract during the longitudinal stretching, or the air pressure inside the bubble may maintain the diameter of the tube or even lead the tube to become strongly blown to obtain transverse orientation. Such blowing normally requires special precautions to be taken, which shall be mentioned later.

By use of the present invention, as this is defined above, the longitudinal melt orientation can be adjusted with a particular precision and/or be made particularly strong. This has importance for several uses especially for the above-mentioned use in cross-laminates.

For achieving a particular high melt orientation, an embodiment of the invention is characterised in that the main proportion of the orientation takes place while the polymer material or materials partly is/are molten and partly crystallized. Preferably at least 5% of the polymer material or materials should be crystallized during that orientation. Thus the polymer flow may advantageously contain a blend of at least two compatible or compatibilised polymers, and the main proportion of the orientation then should take place while one polymer is predominantly in a crystalline state and the other is predominantly in a molten state.

Another embodiment of the invention is characterised in that the friction between the frictional device and the film is controlled by air-lubrication with air which is pressed through holes in the frictional device or through microporous metal, which forms at least a zone of the surface which the flow contacts.

Alternatively, the friction may be controlled by sucking the flow against the frictional device. Thus the suction can be applied through microporous metal, or the surface which the flow contacts can have a grooved pattern, whereby the grooves are circular around the die axis. The grooves are then subjected to a controlled under pressure.

The pulling force on the frictional device can be monitored and used through feed-back means for adjustment of the over- or under-pressure which determines the friction, whereby the degree of orientation is controlled.

In case the extruded tubular film is particularly thick and/or from a polymer of a particularly high molecular weight, the frictional device may have a surface temperature in or above the melting range of the main body of the film. However, this an exception, and normally this device should have a temperature which, when the film is coextruded and has a low melting surface layer on the side facing this device, is even lower than the melting range of this surface layer, otherwise it may be too difficult to obtain a frictional but smooth gliding of the film over the frictional device. This means that the time of contract must be so short that only a very thin surface layer will solidify, while the main body of the film maintains a temperature which is near the predetermined temperature of stretching. The thin solidified layer will melt or part-melt again when it has left the frictional device by heat from the interior of the film.

In order to achieve a particular high frictionally controlled orientation, the temperature of the film during the stretching must be kept within the crystallisation range or slightly above this, as it already appears from the foregoing. Under such circumstances the film should normally be efficiently cooled before it meet the frictional device. For this purpose an embodiment of the invention is characterised in that upstream of the frictional device there is a generally annular, cylindrical or conical part (hereinafter the shock-cooling part) installed for cooling inside or outside the bubble. The flow passes and contacts this in a generally frictionless or low friction manner as established e.g. by air lubrication through microporous metal or through holes. This part is cooled from its inside by means of a fluid cooling medium and kept at a temperature which is sufficiently low to take away at least half of the heat needed to bring the temperature in the flow down to the desired value for the orientation.

Upstream of the frictional device but downstream of the just mentioned shock-cooling part if such part is used, there is a part (hereinafter the "temperature fine adjustment part") of a similar construction as the shock-cooling part, but adapted for a fine adjustment of the average temperature in the flow.

The following succession of apparatus parts are preferably in close proximity to one another or mutually connected through low-heat-transfer connections:

a) the diepart forming one side of the exit orifice,
b) the shock-cooling part if present,
c) the temperature fine adjustment part if present,
d) the frictional device.

All apparatus parts in this succession are on the same side of the bubble, inside or outside.

A preferable way to achieve even and efficient cooling of the tubular film immediately upon its exit from the die, is for the flow to leave the exit orifice under an angle of at least 20° to the axis of the die, its direction of movement pointing either away from or towards the axis, and then meet a cooling part which is in close proximity to the exit orifice or connected to the diepart forming one side of the exit orifice. (Of course the channel forming the exit orifice then should also form an angle of close to 20° or more to the die axis). The mentioned cooling part will be the shock-cooling part described above if that is used, or otherwise the temperature fine adjustment part also described above if that is used or otherwise the frictional device. A substantial part of the zone in which the flow follows the mentioned part should be rounded when seen in axial section, so that the film gradually is turned at least 20° in the direction towards the die axis while it moves over this part or this assemblage of parts.

This arrangement of the exit from the die can be achieved very conveniently when the exit orifice of the die either is at the outer peripherical surface of the die or, if the die has a central cavity which is defined by an inner periphery, is at the inner peripherical surface of the die. This is also a very practical arrangement in connection with the start-up of the extrusion since it then is easier to get hold of the molten mass and feed it over the cooling and temperature controlling annular parts.

Thus it is advantageous for the flow to leave the die under an angle of 90° or close to 90° to the axis. This has the additional advantage that the gap of the exit orifice can be adjusted from location to location as is usually with flat dies. To achieve this at least one side of the exit orifice can be defined by a lip which is sufficiently flexible to allow different adjustments of the gap of the orifice from location to location. Simple mechanical devices like push-pull screws or more sophisticated devices, known from construction of flat dies, can be used for this.

It is noted that peripherical extrusion as such is known, see U.S. Pat. No. 2,769,200 (Longstretch et al.), U.S. Pat. No. 2,952,872 (Buteau et al.), U.S. Pat. No. 3,079,636 (Aykanian) and U.S. Pat. No. 3,513,504 (Ronden et al). The purpose of peripherical extrusion in these patent is to achieve a high blow ratio without any damage to the film. These patents do not disclose the use of an annular device to turn the direction in which the film moves from the transverse toward a more axial direction, but they do disclose the adjustment means at the exit orifice.

As mentioned in the foregoing the tubular film may be allowed to contract circumferentially during the longitudinal stretching, while it is hauled off from the frictional device—in this way the orientation may become truly uniaxial—or it may, by an inside pressure, maintain its diameter or even become blown by a relatively high over-pressure and thereby achieve a significant transverse orientation in addition to the longitudinal components of orientation. The following measures can be taken in order to avoid the over-pressure acting on the tubular film before the latter leaves the frictional device:

If the frictional device is inside the bubble, the part of the air which is contained in the flow before the latter meets the frictional device (hereinafter air 1) is closed off from the air which is contained in the flow after the latter has left the frictional device (hereinafter air 2), and air 2 is kept under a pressure which is substantially higher than the pressure in the ambient atmosphere, while the pressure in air 1 approximately is kept at this ambient pressure. If the frictional device is outside the bubble, there is provided a closed space between the die and the frictional device for the air surrounding the bubble, and the air pressure inside the bubble is kept substantially higher than the ambient pressure, while the outside pressure within the closed space approximately matches the pressure inside the bubble.

As it has been emphasized in the foregoing a particularly important application of the invention is in the manufacture of cross-laminates. For this and several other uses, the flow leaving the die should normally be a coextrudate of two, three or more layers, e.g. a main layer for tensile strength in the middle and thin lamination and/or heatseal layers on one or both surfaces. For the manufacture of cross-laminates the parameters of the process should be adapted to provide a tubular film with an orientation which is predominantly longitudinal or follows a helical direction in the tube. To obtain a predominantly helical or "screwed" orientation there can be established a rotation between a first end comprising the draw-down means and a second end comprising the extrusion die with the frictional device, the shock-cooling part (if this part is used), and the "temperature fine adjustment part" (if this part is used).

The invention shall now be explained in further detail with reference to the drawings, which all show sections made through the axis of the annular extrusion die.

FIG. 1 shows the last part of a coextrusion die with connected frictional device over which the film is bent during the haul off. The extrusion is outwardly peripherical through an exit orifice in the external periphery of the die.

FIG. 2 is similar to FIG. 1, but showing inwardly peripherical extrusion through an exit orifice in the internal periphery of the die, which has a wide tubular cavity around its centre.

FIG. 6 shows, in about natural size, a modification of the "frictional device" of FIG. 3.

Figure 3:
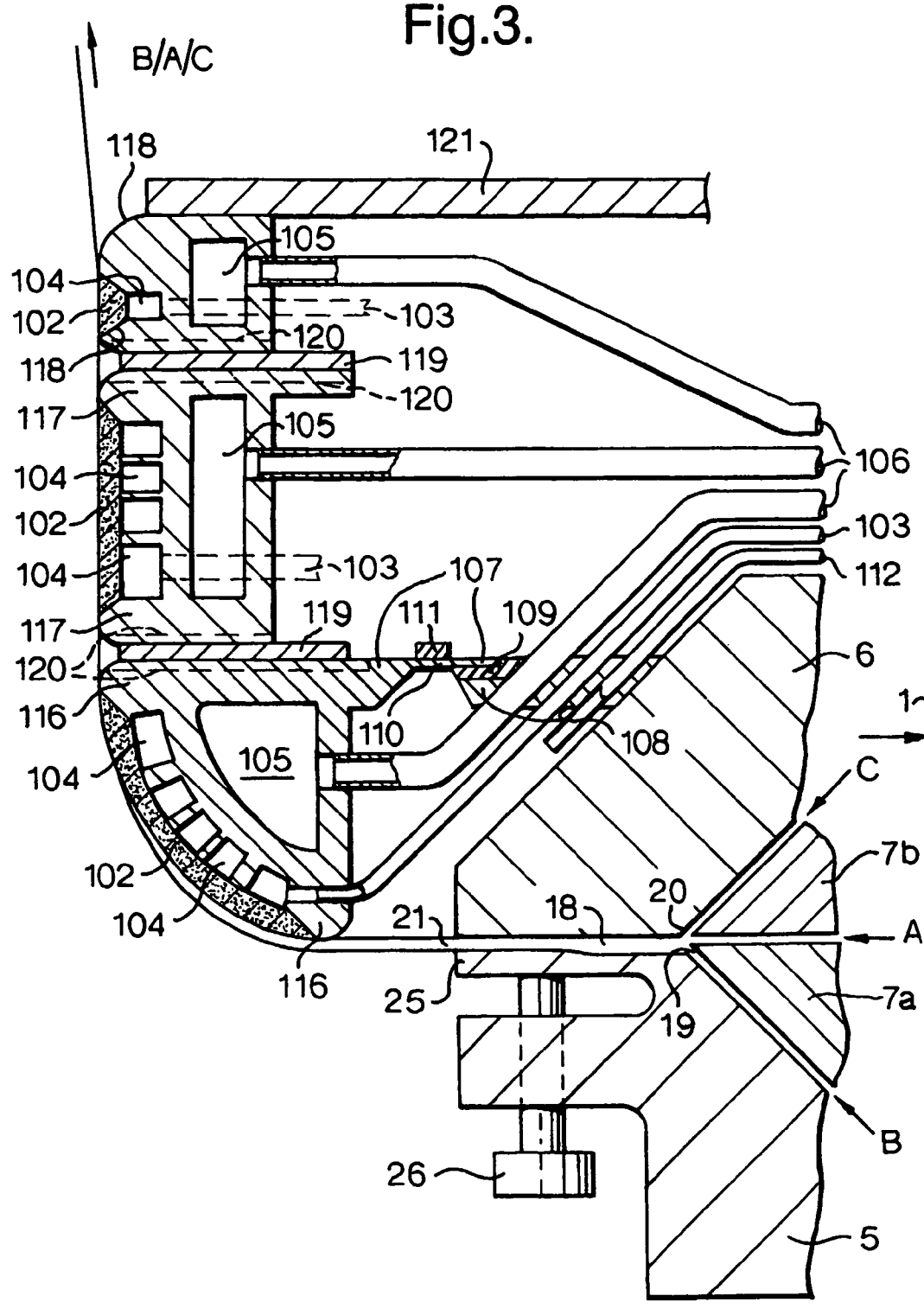
FIG. 3 is similar to FIG. 1, but in addition to the frictional device there is a shock-cooling-part and a temperature-fine-adjustment-part.

The peripherical annular coextrusion of which the outward part is shown in FIG. 1, can conveniently be the die which in full is shown in the inventor's copending WO-A-02/51617 FIGS. 7 to 9 (one of the patent applications, from which priority is claimed for the present case). The reference numerals for the die itself are also taken from these figures. The die axis is parallel with the dot-dash line (1), but as the arrow indicates the real axis is much more to the right in the drawing. Other construction of the peripherical coextrusion die can be of course also be used.

The die is assembled from bowl- and disc-formed parts, of which (5), (6), (7a) and (7b) appear from FIG. 1. Three components (A), (B) and (C) are coextruded to form the film B/A/C. If the invention is used to make films to become cross-laminated, (A) which forms the middle layers would be the layer to supply the main strength, while (B) and (C), the surface layers, should form lamination and/or heatseal layers (referring to the above mentioned patents regarding cross-lamination technology). They should then exhibit lower melt ranges and normally also lower melt viscosities than (A). As a practical example, (A) may be a compatibilised blend of 25% homo-polypropylene of a relatively high molecular weight, 25% HMWHDPE and 50% LLDPE, (C) if chosen as heatseal layer can be plain LLDPE, and (B) if chosen as lamination layer can be a low melting copolymer of ethylene as e.g. EPDM or low melting metallocene polyethylene—or a blend or such polymer with LLDPE, (B) merges with (A) at the internal orifice (19) while (C) merges with (A) at the internal orifice (20). These two orifices are here shown immediately adjacent to each other, and for rheological reasons this is very advantageous when the surface components have lower melt viscosities than the middle component.

The three merged components proceed through the exit channel (18) towards the exit (21) in radial direction. Having left the exit, the tubular B/A/C-film is pulled, still in a radial direction, towards the outer surface of "the frictional device" (101). Here it is bent upward, following the surface of the "frictional device" (101), which forms part of a toroid ("donut-shape"). During this travel it is cooled by the frictional device (101) and is air lubricated, but in a controlled manner so that there is a controlled friction between the frictional-device (101) and the film. The friction in combination with the temperatures in the B/A/C film controls the longitudinal orientation which is introduced in the film. The means for air lubrication, temperature control and control of friction are explained below.

Having left the frictional device (101), the B/A/B film may, by an over-pressure within the bubble, have its diameter expanded and thereby also get a significant transverse orientation, but if a significantly uniaxial character of the orientation is preferred, the blow ratio should be very low or may even be inverse (contraction). Due to rather high contracting forces during the longitudinal stretching there should normally be established an over-pressure inside the bubble also where the tube contracts.

Having left the frictional device (101) the BWC-film is further cooled by air (not shown), preferably both external and internal cooling, in well-known manner. It is hauled off also in well-known manner (not shown) by use of a collapsing frame and driven rollers, and normally thereafter spooled up as a flat film. Due to high stretching forces it may be necessary to substitute the collapsing frame by a set of converging transport belts, a method which also is known, e.g. from the above mentioned U.S. Pat. No. 3,513,504.

At the exit orifice (21) one dielip (25) is made adjustable with the possibility to have the gap varying around the circumference and thereby compensate for accidental differences in the flow. This can be done in simple manner when the channel here is flat (as shown) or almost flat instead of being pronouncedly conical or being tubular. The adjustment can be made by a circular row of screws, of which one (26) is shown. It is sketched as a simple screw but could also be a push-pull screw. Instead of screws there can also e.g. be used thermally expansive devices as now used for similar adjustments of the exit orifice in flat dies.

As already mentioned it is not new to carry out peripherical extrusion, and in this connection such adjustment of the exit orifice is also known. However, it is of particular importance in connection with the present invention, since the normal precautions to achieve even film thickness would cause difficulties. These normal precautions work on the principle of different cooling of the extruded tubular film at different circumferential positions, either established by local air cooling of the bubble, or differential local cooling of a dielip. However, such systems do not combine well with the contact cooling of the film used in the present invention. Details regarding the air lubrication and the cooling of the B/A/C-film on the frictional device (101), and means to controls friction and temperature, will now be explained. The frictional device (101) can be made of steel, and almost the whole of the surface which the film passes over, is made from microporous metal, shown as a rounded plate (102). This can be screwed to the base steel part of the frictional device (101). (None of the drawings will show any of the screws used to connect the different dieparts). The microporous plate can conveniently have pore size around 0.01 mm. The compressed air for the air lubrication is fed through a number of pipes, of which FIG. 1 shows one (103). It is distributed over a network of channels in (101). The drawing shows only the channels (104) which extend circularly centred on the axis of the die. The drawing does not show the channels which extend perpendicularly to channels (104). In some cases there should be applied suction instead of over-pressure, namely when the film is especially thick and/or of an especially high average molecular weight. The frictional device (101) is supplied with an annular cavity (105) for circulation of a cooling fluid, e.g. water, oil or air. The circulating fluid allows the temperature of the surface of (101) to be controlled within a few degrees. For that purpose there can be provided a thermocouple relatively close to the surface (not shown).

The cooling fluid is directed in and out of the annular cavity (105) through pipes of which one (106) is shown. These pipes and the other pipes mentioned above and below pass out through a large cavity at the centre of the die, which cavity appears from the above mentioned FIG. 7 in patent application WO-A-0251617. The pipes for the cooling fluid are connected with a circulation pump and a heating/cooling unit. Similarly, the above mentioned pipes (103) are connected with an air-accumulator and a compressor (or vacuum pump if suction is used) with means to adjust the pressure.

The frictional device (101) is fixed to diepart (6) through a number of arms (e.g. three or four) of which one (107) is shown. Diepart (6) has corresponding arms (108) each of which is fixed to an arm (107) through a heat insulating plate (109). This is done in order to avoid any significant heat transfer between the hot diepart and the much colder frictional device. Each of the arms (107) has a relatively thin bridge part (110), thin enough to achieve measurable variations in bending with variable pull in the film, and at least one of these thin portions is supplied with a suitable dynamometer e.g. a strain gauge device (111). Signals from this device are fed to the devices which control the over-pressure or vacuum; reducing or increasing the friction between the film and the frictional device (101), so that the orientation is kept at the desired value. In order not to make too much resistance against the bending of (111), each of the pipes (103), (106) and (112)—the last will be described below—may comprise a corrugated segment (not shown).

Internal air cooling and the air pressure required to maintain the blow ratio which has been set, are established by conventional devices. The devices pass through the above mentioned cavity at the centre of the die. This is closed off from the environment. A thin plate (113), installed between diepart (6) and frictional device (101) separates the inside of the bubble, which is held under pressure, from the space (114) between die and frictional device, and this space is kept at about ambient pressure through the pipe (112). Without the dividing plate (113) the film would be ruined by the pressure inside the bubble as it leaves the exit (21).

Since, roughly speaking, about half of the heat used to cool down the film to about ambient temperature, will be taken by the contact cooling, and normal air cooling systems used thereafter, the "tower" with haul-off devices can be very short. If a helically extending orientation is wanted, these haul-off devices may rotate around the die axis, and the flat tubular film may be reeled up at the top of the "tower".

Using the above mentioned example in which the main layer consists of a blend of homo-PP (solidifying at about 160° C.), HMWHDPE (solidifying at about 125° C.) and LLDPE (solidifying at about 120° C.), the film will leave the exit (21) with a temperature of about 220-240° C. and to achieve a convenient high longitudinal orientation, a considerable amount of the draw-down can e.g. take place between 130-150° C. To achieve sufficiently quick cooling, and also to avoid that the lower-melting surface layer inside the bubble sticks to (101), the latter may be cooled e.g. to about 50° C. The length of the film-travel over the surface of (101) must be adapted so that, when the film leaves (101), its average temperature still will not have reached down to 125° C. A thin part of the film directly contacting (101) will be cooled below this and solidify, but will melt again when the film has left (101).

Depending on the balance between longitudinal draw-down ratio, temperatures and frictional resistance, the majority of this draw-down may take place before or after PP has crystallized. Thus e.g. a 2.5 mm thick film leaving exit (21) may be drawn down to a thickness of 0.250 mm before the PP solidifies and thereafter drawn down to a thickness of 0.05 mm.

In FIG. 2, relating to extrusion out of a peripherical exit leading into an interior cavity in the circular die, the die axis is indicated by the dot-and-dash line (1). The upper part of this cavity is closed off from the atmosphere by means of the circular plate (115). Over this plate, inside the bubble there is kept an over-pressure, and there is internal cooling. Devices for imposing the pressure and cooling are not shown. By means of the thin plate (113) the space (114) is separated from the atmosphere, and the pressure in this space is through the pipe (112) kept at approximately the same value as the pressure inside the bubble (which is shown on the left of the film). In other respects FIG. 2 can fully be understood on basis of what is explained in connection with FIG. 1.

Figure 4:
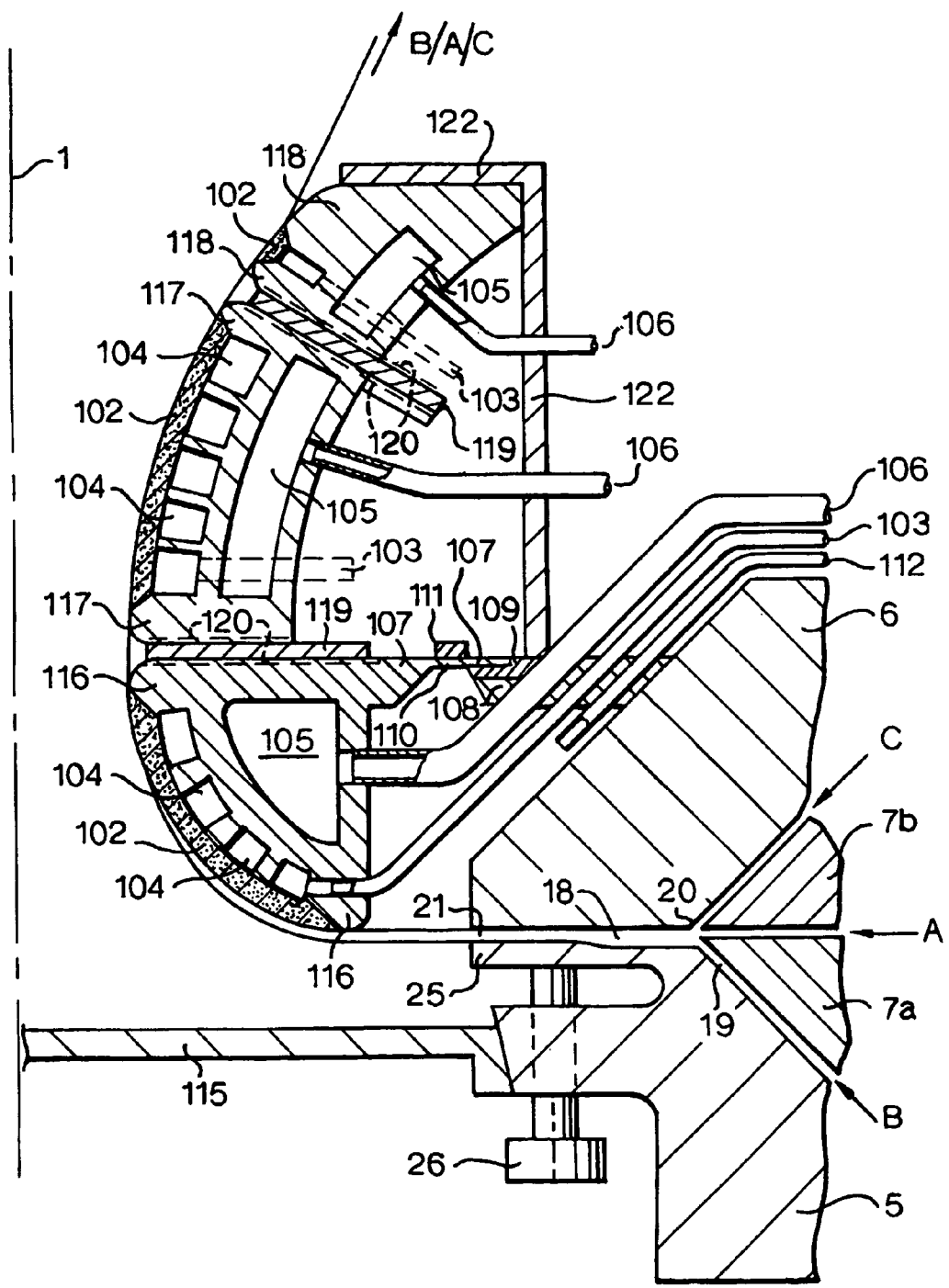
FIG. 4 is similar to FIG. 3, but for inwardly peripherical extrusion like in FIG. 2.
Figure 5:
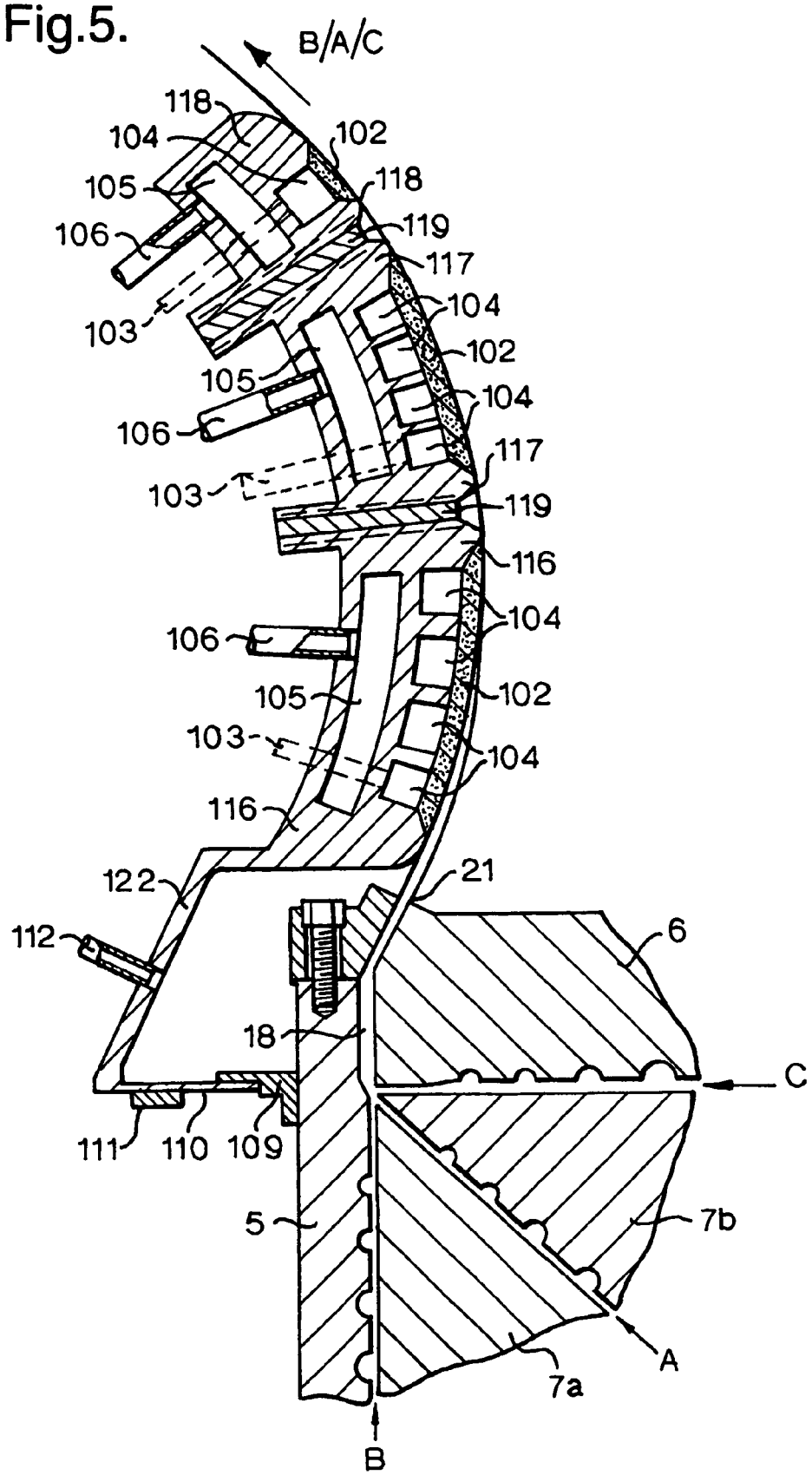
FIG. 5 shows the last part of a coextrusion die in which the exit orifice is arranged through the generally plane die surface, which is perpendicular to the axis, like an annular die for film extrusion, but with the exit orifice pointing inwardly under an angle of about 20°. The die is supplied with a shock-cooling-part, a temperature-fine-adjustment-part, and a frictional device.

It appears from the description of FIG. 1 that it is relatively difficult to obtain the most desirable combination of orientation and draw-down ratios with the relatively simple devices shown in FIGS. 1 and 2. The more complicated devices shown in FIGS. 3 to 5 improve these relations. In each construction there are used three independent parts:

a) a shock-cooling part (116),
b) a temperature-fine-adjustment part (117) and
c) a frictional device (118).

The three parts are kept thermally insulated from each other by insulating plates (119). Each of the three parts have devices for directing air for lubrication—or in the case of (118) it may be for suction—and/or circulation of a cooling/heating fluid, which are similar to those devices as explained in connection with FIG. 1. The three parts are controlled independently of each other. During the passage over parts (116) and (117) the friction is controlled using information from the strain gauge device (111). The dotted lines (120) show grooves through which the compressed air used for air lubrication can escape.

As is explained in connection with FIGS. 1 and 2; it is important to avoid any significant pressure difference between the two sides of the film when the latter leaves exit (21). This is achieved by the use of separation walls (121 and 122).

In the variation of the frictional device (118) shown in FIG. 6 the friction is controlled by suction, but not through microporous metal. Instead of this there are grooves (124) in this part, e.g. with a pitch of about 3 mm and about 2 mm deep and 1 mm wide, with rounded crests (125), and a controlled vacuum is applied through the holes (123).

Using again the afore-mentioned example of suitable materials, the shock-cooling part (116) can conveniently be kept at a temperature which cools the film to about 140-150° C., the temperature-fine-adjustment part (117) at a temperature so as to adjust this temperature of the film more exactly e.g. at 145° C., and part (118) can be kept at 50° C. to avoid sticking. The passage over the frictional device (118) takes so short time that the drop in average film temperature will be very low.

The invention claimed is:

1. In a process of forming a tubular oriented film of at least one thermoplastic polymer film material having a crystallisation range by extruding a flow of said at least one molten thermoplastic polymer material from a circular extrusion die in the form a continuous hollow tube, in which process said flow after leaving a circular exit orifice in the die is cooled and is oriented at least in the longitudinal direction while still being at least partly molten, said longitudinal orientation taking place by a pulling force applied to the tubular flow by moving draw-down means, and in which process the flow while still at least partly molten on its travel between the exit orifice and the draw-down means passes and is in frictional contact with a surface of an annular friction device, which can be arranged inside or outside said tubular flow, the improvement wherein said longitudinal orientation is enhanced and determined by controlling the temperature of said surface of said frictional device by means of a fluid heat-exchange medium to impart to the flow a temperature within or slightly above the crystallization range of said thermoplastic material, and controlling the frictional resistance resulting from said frictional contact by creating through holes or micropores in said surface of said frictional device which is in contact with said tubular flow a selected gaseous pressure differential acting on at least portions of a surface of said flow contacting the surface of the frictional device and/or the opposite surface of said flow, the degree of frictional resistance imposed by said frictional device surface being adapted to produce between the frictional device and said draw-down device and while said flow is at the said temperature, a controlled contribution to the longitudinal orientation of said flow.

2. A process according to claim 1 in which said contribution to longitudinal orientation is controlled to produce a longitudinal shrinkability of a factor of no less than about 4, as determined by shrink testing carried out at the upper limit of the melting range of the extruded film.

3. A process according to claim 1, in which the main proportion of said longitudinal orientation takes place while such polymer material partly is molten and partly crystallised.

4. A process according to claim 3, wherein at least 5% of such polymer material is crystallised.

5. A process according to claim 1 wherein the polymer flow contains a blend of at least two compatible or compatibilised polymers, and the main proportion of the orientation takes place while one of said polymers is predominantly in a crystalline state and the other is predominantly in a molten state.

6. A process according to claim 1 wherein the degree of frictional resistance is controlled by gaseous lubrication with a gaseous medium passed through holes or fine pores in at least a portion of the surface of the friction device which is contacted by the polymer flow.

7. A process according to claim 1, wherein said pressure differential is created by suction applied through an array of said holes or micropores in said surface of said frictional device.

8. A process according to claim 1, wherein the surface of said frictional device contacted by the polymer flow has holes therein in the form of a pattern of grooves, the grooves being circular around the die axis, and the grooves are subjected to a controlled below-atmospheric pressure sufficient to increase the friction between the polymer flow and said surface.

9. A process according to claim 1 including the steps of monitoring the tension created in the polymer flow by its contact with the frictional device and adjusting the level of such frictional resistance in response to the results of such monitoring, whereby the degree of orientation is controlled.

10. A process according to claim 1 wherein upstream of the frictional device there is a generally annular, cylindrical or conical shock-cooling member inside or outside said bubble over which the tubular polymer flow passes in a generally frictionless or low friction manner, said member being cooled from its inside by means of a fluid cooling medium and kept at a temperature which is sufficiently low to remove from the flow at least half of the heat needed to bring its temperature to the desired value for the orientation.

11. A process according to claim 10 in which the polymer flow past the shock-cooling device is lubricated by air lubrication through micropores or holes therein.

12. A process according to claim 10 which includes the steps of passing the tubular polymer flow upstream of the frictional device and downstream of the shock-cooling member in substantially frictionless manner over a fine temperature adjusting member which is annular, conical or cylindrical and adjusting the temperature of said adjusting member from its inside by a fluid heat-exchange medium for a fine adjustment of the average temperature in the flow.

13. A process according to claim 1 wherein the exit angle of the polymer flow from the die orifice is substantially 90° to the die axis.

14. A process according to claim 1 wherein at least two layers of molten thermoplastic polymer material are coextruded from said circular die orifice to form said polymer flow.

15. A process according to claim 1 including the step of imparting to the orientation of said tubular film a helical direction between said extrusion die and said draw-down means in order to produce a tubular film with predominately helical orientation.

16. A process according to claim 1 wherein the frictional device is disposed inside of the tubular flow in spaced relation to the die orifice to create a space within the flow between the frictional device and the die orifice and the space thus-created is isolated from the interior of the flow downstream of the frictional device, and including the step of maintaining within the interior of the flow downstream of the frictional device a gaseous pressure which is substantially higher than ambient pressure while the isolated space is maintained under a gaseous pressure near ambient pressure.

17. A process according to claim 1 wherein the annular frictional device is disposed around the exterior of the tubular flow in spaced relation to the die orifice to create an annular space therebetween and the thus created annular space is isolated from the ambient atmosphere and including the step of maintaining within the interior of the tubular flow a gaseous pressure that is substantially higher than atmospheric pressure while the isolated exterior annular space is held under a gaseous pressure approximately equal to the pressure maintained within said flow interior.

18. A process according to claim 1 wherein said polymer flow is withdrawn from said die exit orifice at an angle of at least 20° towards or away from the axis of said die and then passed through a cooling zone prior to its contact with the frictional device, a substantial part of the path of said flow through said cooling zone being rounded when viewed in axial section.

19. A process according to claim 1 including the further step of imparting a predominately helical orientation to said tubular film by establishing relative rotation between said draw-down means and the extrusion die.

20. A process according to claim 1 including the steps of cutting said polymer flow at an angle to its longitudinal direction after its passage through said draw-down means to generate a web with a biased dominant direction of orientation and laminating together at least two of the resultant webs with their dominant directions of orientation in criss-crossing relation to create a cross-laminate.

21. In an apparatus for extruding and orienting molten thermoplastic polymer material comprising an annular die having a circular exit orifice through which the molten material is extruded while being inflated by a gaseous medium at a determined pressure to form a tubular flow, downstream of said exit orifice moving draw-down means for applying longitudinal tension to the extruded flow whereby the material of the flow is oriented at least in the longitudinal direction while still at least partially molten, and, disposed between the exit orifice and the draw-down means either inside or outside of said tubular flow, an annular frictional device having an annular surface arranged for frictional contact with a surface of the tubular flow, the improvement wherein the frictional device comprises means for controlling the temperature of said annular surface thereof by means of a fluid heat-exchange medium to impart to the tubular flow a selected temperature; and means comprising holes or micropores in the said annular surface of said frictional device in contact with said flow surface and means in communication with said holes or micropores for supplying a gaseous fluid medium thereto under a selected gaseous pressure controllable independently of the tube inflation pressure, whereby the frictional resistance experienced by said tubular flow in passing over said frictional device surface can be controlled.

22. Apparatus according to claim 21 wherein said means in communication with said holes or micropores comprises a vacuum source connected to said holes or micropores on the opposite side of said surface of said frictional device from the tubular flow in contact therewith for imposing an inward flow of said gaseous medium into said holes or micropores to thereby increase the frictional resistance experienced by said tubular flow in passing over said device surface.

23. Apparatus according to claim 21 in which the annular surface of the frictional device has holes therein in the form of a pattern of grooves therein which are circular around the die axis and including means for connecting said grooves to a source of vacuum.

24. Apparatus according to claim 21 which further comprises means for measuring the frictional resistance experienced by said tubular flow in passing over said device surface by sensing changes in the tension therein and means responsive to such measurement to control the supply of said gaseous medium to said holes or micropores in said frictional device.

25. Apparatus according to claim 21 further comprising a shock-cooling member of generally annular, circular, or conical configuration disposed upstream of the frictional device, said member having a surface over which the extruded tubular flow passes in a substantially frictionless contact, said member being cooled by a flow of cooling medium through its interior to supplement said frictional device in adjusting the temperature of said tubular bubble.

26. Apparatus according to claim 25 in which the shock-cooling member is provided with air lubrication means to lubricate the passage of the tubular flow over the surface thereof.

27. Apparatus according to claim 26 in which the air lubrication means comprises holes or micropores in the surface of the shock-cooling means and a source of positive air pressure connected to said holes or micropores on the side thereof opposite said tubular flow for imposing a flow of air through the holes or micropores against the tubular flow.

28. Apparatus according to claim 25 further comprising a generally annular fine temperature adjustment member of circular, cylindrical or conical configuration upstream of the friction device and downstream of the shock-cooling member over which the extruded tubular flow passes in a substantially frictionless manner, said fine temperature adjustment member having its temperature adjusted by a flow of heat exchange medium through its interior.

29. Apparatus according to claim 21 wherein the die is arranged for the flow of extruded material to leave the die exit orifice upstream of said frictional device at an angle of at least 20° to the axis of the die, the angle being directed towards or away from said axis, and said frictional device has a rounded profile when seen in axial section whereby the tubular flow of material passes around said rounded profile to undergo a change in direction of at least 20°.

30. Apparatus according to claim 29 in which the exit orifice is at the outer peripheral surface of the die.

31. Apparatus according to claim 30 in which the annular frictional device extends around the inside of the tubular flow.

32. Apparatus according to claim 29 in which the exit orifice is at the inner peripheral surface of the die.

33. Apparatus according to claim 32 in which the annular frictional device extends around the outside of the tubular flow.

34. Apparatus according to claim 30 in which the tubular flow of extruded material leaves the die at an angle of about 90° to the die axis.

35. Apparatus according to claim 31 wherein the frictional device is disposed in the interior of the tubular flow in spaced relation to the die orifice and which further comprises enclosure means for isolating the space in the interior of the tubular flow between the die orifice and the frictional device from the space in the interior of the tubular flow downstream of the frictional device and means for imposing a higher gaseous pressure in the space downstream of the frictional device than in the space upstream thereof.

36. Apparatus according to claim 33 wherein the annular frictional device is disposed around the exterior of the tubular flow and which further comprises enclosure means for isolating from the ambient atmosphere a space around the tubular flow between the die and the frictional device and means for imposing a gaseous pressure substantially higher than ambient in the space thus isolated; and means for closing the interior of the tubular flow from the atmosphere and for imposing in the flow interior thus enclosed a gaseous pressure approximately equal to the pressure in the isolated space.

37. Apparatus according to claim 21 in which one of said extrusion die and said draw-down means is mounted for rotation relative to the other of said extrusion die and said draw-down means and including means for rotating the rotatably mounted one to impart a helical twist to the tubular flow while traveling from said die to said draw-down means.

38. Apparatus according to claim 21 further comprising means downstream of said draw-down means for cutting the tubular flow from said draw-down means at an angle to form a film with a biased dominant direction of orientation and means for laminating together at least two of such films with their dominant directions of orientation in criss-crossing relation to create a cross-laminate.

\* \* \* \* \*